United States Patent [19]

Bauer et al.

[11] 4,204,724
[45] May 27, 1980

[54] FILM CASSETTE WITH ANTI-SHOCK LATCHING MEANS

[75] Inventors: Walter Bauer, Munich; Kröbel, Taufkirchen; Färber, Munich, all of Fed. Rep. of Germany

[73] Assignee: AGFA-Gevaert, A. G., Leverkusen, Fed. Rep. of Germany

[21] Appl. No.: 32,454

[22] Filed: Apr. 23, 1979

[30] Foreign Application Priority Data

Apr. 26, 1978 [DE] Fed. Rep. of Germany ....... 2818338

[51] Int. Cl.² .................. E05C 1/10; E05C 9/04; E05C 9/14; G03B 17/26
[52] U.S. Cl. .................. 354/281; 206/1.5; 206/387; 292/DIG. 22; 292/42; 354/288
[58] Field of Search .............. 354/281, 275; 206/1.5, 206/387; 220/307, 345, 346, 348; 352/78 R, 78 C; 250/480, 481; 292/DIG. 22, 42, 302

[56] References Cited

U.S. PATENT DOCUMENTS

| 2,293,363 | 8/1942 | Schell | 292/302 X |
| 2,742,174 | 4/1956 | Frieder et al. | 206/1.5 X |
| 2,878,389 | 3/1959 | Raffman | 250/481 |
| 3,183,852 | 5/1965 | Fritz | 220/345 |
| 3,958,125 | 5/1976 | Zechmair et al. | 354/281 X |

FOREIGN PATENT DOCUMENTS

| 3345 | 1/1879 | Fed. Rep. of Germany | 292/42 |
| 783786 | 7/1935 | France | 250/481 |

Primary Examiner—L. T. Hix
Assistant Examiner—Shelley Wade
Attorney, Agent, or Firm—Peter K. Kontler

[57] ABSTRACT

A film cassette including a base and a cover, two lock and release slides selectively movable for locking the cover to the base in a closed position and for releasing the cover from the base in an open position, and a linkage for linking the two slides together such that when forces arise on the two slides when a jolt is experienced, the forces on the two slides act against one another. In this way, the chance of such forces leading to movement of the two slides is reduced.

7 Claims, 3 Drawing Figures

U.S. Patent    May 27, 1980    4,204,724
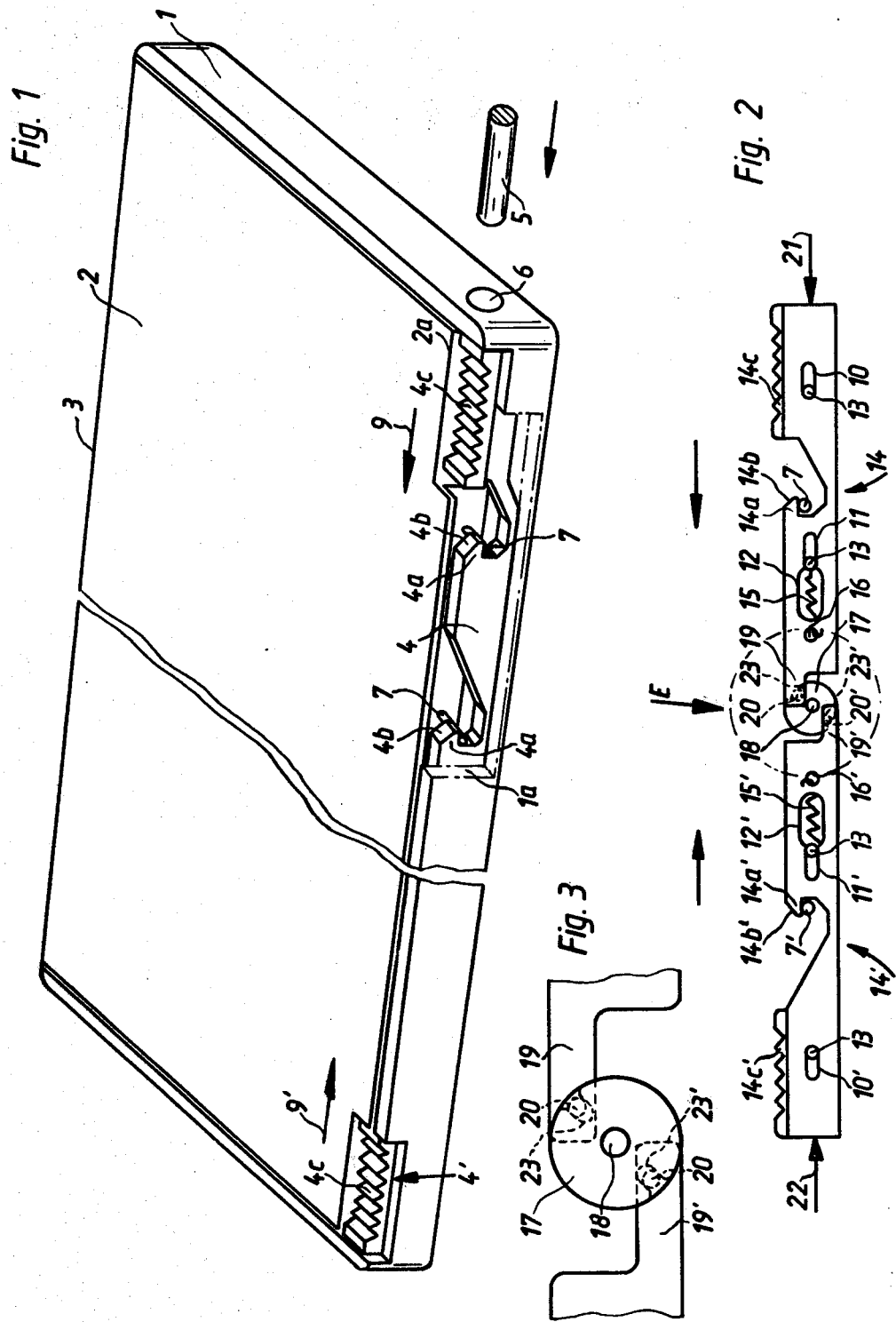

FILM CASSETTE WITH ANTI-SHOCK LATCHING MEANS

BACKGROUND OF THE INVENTION

The present invention relates to a film cassette, particularly an X-ray film cassette. More particularly, the invention relates to a mechanism in a film cassette for locking and releasing a cassette cover to and from its base.

In flat film cassettes the cover is usually connected to the base using a hinge on one edge. When this technique is used, the lock and release mechanism is situated on the side of the cassette opposite to the hinge. There are, however, cassettes in which the cover is placed essentially in a parallel attitude onto the base and there secured by lock elements situated on at least two opposite sides of the cassette. In the case of larger cassettes of the first mentioned type, it is usual to provide several lock elements along the locking side.

Now, in the case of cassettes such as have been discussed, it has become evident that there is a danger that a cassette can rather easily spring open if the cassette experiences a jolt in a certain direction. The probability that a cassette will some time fall to the floor in an X-ray laboratory (where several cassettes are always being dealt with at the same time) is relatively high. The opening of a cassette is especially unpleasant when it contains a film that has already been exposed. Naturally, the film becomes unusable, and the patient must be asked to undergo another X-ray procedure and must be subjected to the radiation dosage a second time.

OBJECTS AND SUMMARY OF THE INVENTION

It is an object of the invention, consequently, to provide for film cassettes of the types mentioned above, a mechanism which reduces the chance of an unintentional opening of a cassette should the cassette experience a jolt.

This (as well as other objects which will become apparent in the following) is achieved in such a manner that when, for example, a cassette chances to fall to the floor, the possibility that the cassette will open is reduced by linking two lock and release means of matched masses together in a way allowing the forces arising in the two lock and release means, because of a jolt, to act against one another, thus cancelling one another, at least in part, and therefore reducing the chance that such forces would move the lock and release means to open the cassette.

A preferred example of suitable lock and release means includes slides. In a slide of about 8 grams, the opposing force of a spring would have to be about 80 newtons assuming (1) that the cassette falls a distance of one meter, (2) that a one-millimeter damping distance is available, and (3) that friction on the slide is neglected. Springs of this size are, however, unacceptable in X-ray film cassettes.

The novel features which are considered as characteristic of the invention are set forth in particular in the appended claims. The improved film cassette itself, however, both as to its construction and its mode of operation, together with additional features and advantages thereof, will best be understood upon perusal of the following detailed description of certain specific embodiments with reference to the accompanying drawing.

BRIEF DESCRIPTION OF THE DRAWINGS

FIG. 1 is a perspective view of a part of an X-ray film cassette in which a portion has been broken out to expose the lock and release mechanism of the cassette;

FIG. 2 is a side view of a lock and release mechanism according to the invention; and FIG. 3 is a detail of FIG. 2 within the region pointed out by arrow "E" of FIG. 2.

DESCRIPTION OF THE PREFERRED EMBODIMENTS

Referring first to FIG. 1, base 1 of a flat film cassette is connected with cover 2 along edge 3 by means of a hinge or hinges (not shown). Opposite to the hinge side at edge 3, the base is provided with a slide 4. This slide is situated on sidewall 1a and is guided in a recess in the floor of the base. Slide 4 exhibits two hooks 4a whose backsides have an inclined surface 4b. Additionally, an actuating element, or touch piece, 4c is formed on the slide 4. When the cover 2 is locked in the closed position, as shown, this touch piece is accessible through an opening 2a in the cover. Touch piece 4c is located essentially in one corner of the X-ray film cassette and can be operated, besides by hand, also by a pin 5 through hole 6 in the side of base 1. Pin 5 strikes against a side surface of touch piece 4c. Pin 5 is preferably part of an automatic loading, unloading device in which a film can be placed in the cassette or withdrawn from it in daylight. Such a device is available commercially, for example, in the form of System Gevamatic L of Agfa-Gevaert AG, Munich, West Germany.

About at the location of the hooks 4a are protrusions in the form of pins 7 mounted on a sidewall of the cover 2. In the rest position of slide 4, that is to say in the closed position of cover 2, the hooks 4a hook on the pins 7 of cover 2.

Slide 4 is movable in the direction of arrow 9 and is held in the illustrated rest position by a tension spring as will be described below on the basis of FIG. 2. On the same side of the cassette there is a second slide 4' which operates oppositely to the first slide 4.

For opening the cassette, it is only necessary to push the touch pieces 4c toward the center of the cassette in the arrow directions 9, 9' so that the hooks 4a move out from the pins 7. The cassette cover can be provided with a built-in curvature so that when the hooks 4a move free of pins 7, the stress held in the cover in its closed position causes the cover to spring up from the base. An example of a suitable built-in curvature is to have the cover bulge in the open position convexly toward the film placed in the cassette. When the cover is closed, its convex form becomes planar, while at the same time there occurs an even pressure of the cover over the surface of the film. When the cover is released, the convex form returns, causing the cover to spring up from the base. The slides 4 could just as well be moved by operation of pin 5 in the desired direction. In closing the cassette, cover 2 is pushed against base 1. When this is done, the pins 7 move against the inclined surfaces 4b of the slides 4, causing the slides to move out of their rest position until the hooks 4a spring back to hook onto pins 7.

A closer look at the invention will now be effected on the basis of FIG. 2. The two slides 14 and 14' illustrated there have each been given only one hook 14a, 14a', in order not to clutter the drawing. The hooks 14a, 14a' grasp around the pins 7, 7' mounted on cover 2. In these slides 14 and 14', there are in each case two slots 10 and 11, 10' and 11' extending parallel to the direction of movement of the slides. In these slots run pins 13 sticking out from the sidewall 1a of the base, for the purpose of guiding the slides 14 and 14'. The slots 11, 11' have widened portions 12 and 12' directed toward the middle of the cassette. In these widened portions, tension springs 15 and 15' are accommodated. Each tension spring 15, 15' is secured with one end on one of the pins 13 and with its other end in a hole 16, 16' formed in its slide 14, 14'.

On the mutually facing ends of slides 14, 14' there is in each case a projection 19, 19'. The one projection 19 can be journaled on the one end of a link 17 at a pivot point 20, and the other projection 19' is then journaled on the other end of the link 17 at the pivot point 20'. Link 17 is pivotably or rotatably mounted at its midpoint about an axle 18 mounted on sidewall 1a.

For a simple manufacture of the elements 17 to 20 it is helpful, as shown in FIGS. 2 and 3, to make the link 17 in the form of a small wheel in which, for the journal locations 20 and 20', there is provided radially-oriented slots 23 and 23'. On each of the projections 19 and 19', there is a small pin 20, 20' extending parallel to the axle 18 and fitting in the respective slots 23 and 23'.

Operation of this mechanism for opening and closing a cassette is as follows:

The position of the slides 14 and 14' as shown in FIG. 2 represents the closed position of the cassette. Here, the pins 7 and 7' of cover 2 are in position under the hooks 14a and 14a'. To release the cover, touch piece 14c is pushed in the direction of arrow 21 and touch piece 14c' in the direction of arrow 22. In this way, the slides 14 and 14' move toward one another and the pins 20 and 20' at the projections 19 and 19' turn the small wheel 17 in a counterclockwise direction about the axle 18. As already described above with respect to FIG. 1, pins 7 and 7' spring out of the slide region due to the spring action of the cover 2, and the cassette is opened. When the touch pieces 14c and 14c' are released, the slides move back into their illustrated positions because of the biasing spring forces exerted by springs 15 and 15'. In closing the cassette, the pins 7 and 7' press as in FIG. 1 on the inclined surfaces 14b and 14b' and, in this way, move the slides 14 and 14' again in the directions 21 and 22 toward one another. After the pins come to the positions under the hooks 14a and 14a', the slides 14 and 14' return into the illustrated position.

Because of the linkage connection of the slides 14 and 14', it is also possible to open the cassette by moving only one of the slides, since the one that is moved pulls the other slide likewise into the open position by way of link 17. This is especially of advantage when the cassette is to be opened in a loading, unloading device using pin 5. It is not necessary to have a second pin 5 and supporting structure.

Now, if the cassette experiences a short, hard jolt such as can arise, for example, if the cassette falls to the floor, an opening of the cassette even just on one side is prevented. The reason for this is that for every force situation which acts on both slides in the same direction, an equilibrium arises between the two slides 14 and 14' so that these remain unmoved. For instance, if the cassette falls on the right side, then a force acts on both slides in the direction of arrow 22. The slide 14' would be pushed into its open position, but this is resisted by an opposite force from slide 14 (which likewise has a force component in direction 22) exerted on slide 14' through the linkage connection. The masses of slides 14 and 14' are matched, and preferably are equal, so that the acceleration or deceleration forces arising in them from a jolt are able to cancel through the intermediary of link 17.

Without further analysis, the foregoing will so fully reveal the gist of the present invention that others can, by applying current knowledge, readily adapt it for various applications without omitting features which fairly constitute essential characteristics of the generic and specific aspects of this contribution to the art. For example, instead of using hinges on the base edge 3 opposite the edge bearing slides 4, 4', one can duplicate the illustrated lock and release mechanism with slides 4'', 4''', etc. Therefore, such adaptations should and are intended to be comprehended within the meaning and range of equivalence of the claims.

What is claimed is:

1. A film cassette comprising a base and a cover, two lock and release means selectively movable for locking the cover to the base in a closed position and for releasing the cover from the base in an open position, and linkage means for linking said two means together such that when forces arise on said two means when a jolt is experienced, the forces on said two means act against one another, whereby the chance of said forces leading to movement of said two means is reduced.

2. In a flat film cassette having a base and a cover, a mechanism for releasing and locking the cover to the base, including slide means constrained to move along an edge of the base, spring means for biasing said slide means into a lock position, protrusions on said cover, and hook means in said slide means for locking onto said protrusions in said lock position, wherein the improvement comprises, in said slide means, two oppositely moving slides of matched masses, and a link having two ends and pivotably mounted between said ends on the base, one of said slides being connected with one end of the link, the other of said slides being connected with the other end of the link.

3. A mechanism as claimed in claim 1, said link comprising means for converting movement of any one of the slides in one direction into movement of the other slide in the opposite direction.

4. A mechanism as claimed in claim 2 or claim 3, said link being rotatable on an axle carried by a sidewall of the base, the ends of the link lying opposite to one another, ends of the slides being journaled opposite to one another on the ends of the link.

5. A mechanism as claimed in claim 2 or claim 3, said link comprising a wheel pivotably mounted on an axle carried by a sidewall of said base, the wheel having two oppositely situated radial slots, the connection of the slides to the link being at ends of the slides by way of pins extending parallel to said axle and guided in respective ones of said slots.

6. A mechanism as claimed in claim 5, the ends of the slides being journaled at the pins in said slots, at least one of the slides having means permitting manual actuation.

7. A mechanism as claimed in claim 5, the ends of the slides being journaled at the pins in said slots, at least one of said slides having means behind an opening in a side of the base for machine actuation by way of a pin means of a loading, unloading device moving through said hole.

* * * * *

UNITED STATES PATENT AND TRADEMARK OFFICE
CERTIFICATE OF CORRECTION

PATENT NO. : 4,204,724
DATED : May 27, 1980
INVENTOR(S) : Walter BAUER, Heinz KRÖBEL and Heinrich FÄRBER It is certified that error appears in the above-identified patent and that said Letters Patent are hereby corrected as shown below:

First page, item [75], before "Kröbel" insert --Heinz-- and before "Färber" insert --Heinrich--.

Signed and Sealed this

Thirtieth Day of September 1980

[SEAL]

Attest:

SIDNEY A. DIAMOND

*Attesting Officer*   *Commissioner of Patents and Trademarks*